United States Patent [19]

Dolhen et al.

[11] Patent Number: 4,705,259

[45] Date of Patent: Nov. 10, 1987

[54] DEVICE FOR SEALING AN OPENING AND SLIDE VALVE COMPRISING SUCH A DEVICE

[75] Inventors: Gérard Dolhen, Moret S. Loing; Claude Oberlin, Avon; Jean-Claude Lemarquis, Moret S. Loing; Daniel Bandura, Cesson, all of France

[73] Assignee: Electricite de France (Service National), Paris, France

[21] Appl. No.: 749,017

[22] Filed: Jun. 26, 1985

[30] Foreign Application Priority Data

Jun. 26, 1984 [FR] France .................. 84 10031

[51] Int. Cl.⁴ .............................................. F16K 3/16
[52] U.S. Cl. .................................... 251/61.1; 138/93; 251/327; 251/175; 220/232
[58] Field of Search .............. 251/61.1, 175, 327; 138/93, 96 R; 220/232

[56] References Cited

U.S. PATENT DOCUMENTS 2,877,791 3/1959 Rich .................... 251/61.1 X
3,057,376 10/1962 Agutter et al. ........... 251/61.1 X
4,100,827 7/1978 Flemming .................. 138/96 R

FOREIGN PATENT DOCUMENTS 506043 9/1954 Canada ..................... 251/61.1
248329 6/1970 U.S.S.R. .................... 251/61.1
739299 6/1980 U.S.S.R. .................... 251/61.1

Primary Examiner—Arnold Rosenthal
Attorney, Agent, or Firm—Gifford, Groh, VanOphem, Sheridan, Sprinkle and Dolgorukov

[57] ABSTRACT

The invention relates to a device for sealing an opening (7) defined by an edge (6), comprising a sealing element (2, 102), the dimensions of which are at least equal to those of the opening (7), means for securing the said sealing element opposite the opening, and means for ensuring fluid-tightness between the sealing element (2, 102) and the edge (6). The means for ensuring tightness between the sealing element (2, 102) and the edge (6) consists of a flexible membrane (8), means for fixing the circumference of this membrane to the sealing element (2, 102) so as to define a volume (16) between the membrane (8) and the sealing element (2, 102), and a communication hole (18, 32) provided in the sealing element so as to connect the volume (16) to a source of pressurized fluid.

4 Claims, 8 Drawing Figures

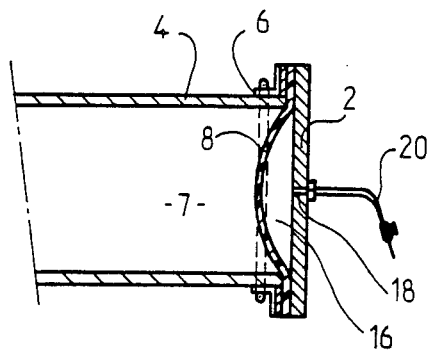
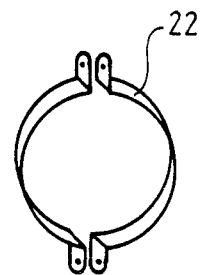
FIG-1    FIG-3
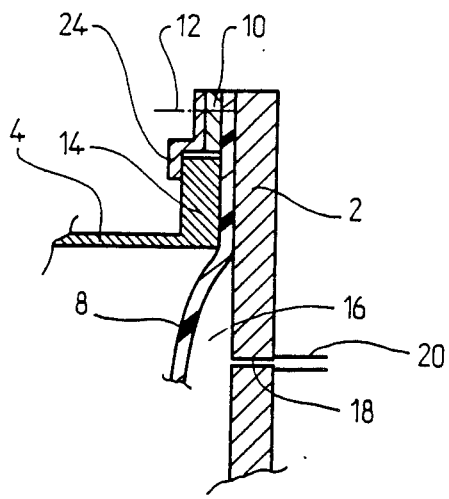
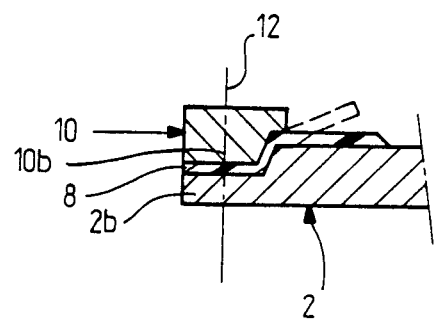
FIG-2    FIG-4
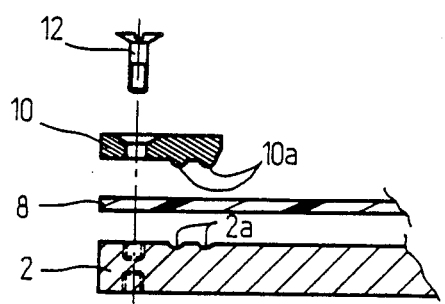
FIG-5

DEVICE FOR SEALING AN OPENING AND SLIDE VALVE COMPRISING SUCH A DEVICE

BACKGROUND OF THE INVENTION

In many technical sectors it is frequently required to seal an opening in a fluid-tight manner, in particular an opening in a fluid-conveying pipe. Generally, a sealing element with dimensions at least equal to those of the opening to be sealed is used and held against the latter. A gasket inserted between the edges of the opening and the sealing element ensures that the required tightness is obtained. Owing to the presence of the gasket, the unevenness in the surface and deformations both of the edge of the opening and of the sealing element can be absorbed to a certain extent. However, it is necessary that these deformations should not exceed certain limits otherwise adequate tightness is not ensured. It is indispensable, therefore, that the sealing element and the edges of the opening to be sealed are machined with a certain degree of precision. The manufacturing costs are therefore relatively high. Moreover, the dimensions of the opening to be sealed must also be relatively precise.

SUMMARY OF THE INVENTION

The present invention overcomes these drawbacks and proposes, to this end, a sealing device which has a simple design and can be easily used and which can be fitted to orifices of different dimensions as well as having a fairly low manufacturing cost.

More precisely, the invention relates to a device for sealing an opening defined by an edge, comprising a sealing element, the dimensions of which are at least equal to those of the opening, and means for ensuring fluid-tightness between the sealing element and the edge.

According to the invention, the means for ensuring fluid-tightness between the sealing element and the edge of the opening to be sealed consist of a flexible membrane, means for fixing the circumference of this membrane to the sealing element so as to define a volume between the membrane and the sealing element, and a communication hole provided in the sealing element so as to connect the said volume to a source of pressurized fluid.

The invention also relates to a slide valve comprising such a sealing device. It consists of a body comprising two walls in which openings defining a passage for a fluid and a sliding piece guided inside the body are formed, and means for moving the sliding piece between a closed position where it seals off the passage and an open position where it leaves this passage free. The invention is such that the sliding piece comprises a flexible membrane on each of its sides, means for fixing the circumference of each membrane to one of the sides of the sliding piece, so as to define a volume between each of the membranes and the sliding piece, and a communication channel passing widthwise through the sliding piece and connecting each of the said volumes to a source of pressurized fluid.

The invention has many advantages. It has a very simple design and therefore a fairly low manufacturing cost. It can be fitted to orifices with different dimensions. It is easy to use. It does not require that the orifice to be sealed off should have very precise dimensions. It therefore does not require a high standard of machining. It can be used very easily on a building site.

The slide valve of the invention has the same advantages.

DESCRIPTION OF THE DRAWINGS

The invention is described below in more detail with the aid of the attached drawings showing several embodiments given by way of example. In the attached drawings:

FIGS. 1 and 2 show a sealing device according to the invention, in which the sealing element is a plate with a single membrane;

FIG. 3 shows a clamping collar which enables a plate such as that shown in FIGS. 1 and 2 to be fixed to the end of a pipe with no fixing flange;

FIGS. 4 and 5 show two variations of embodiment of means for fixing a membrane to a sealing element;

DETAILED DESCRIPTION OF THE PREFERRED EMBODIMENT

Figure 6:
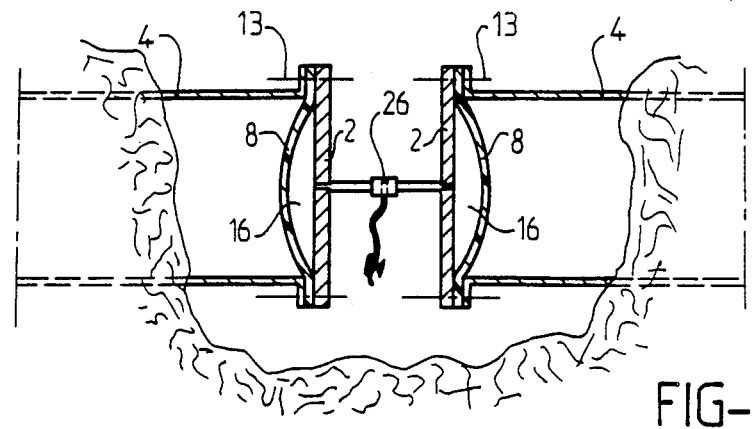
FIGS. 6 and 7 show two applications of a sealing device according to the invention comprising two sealing elements fitted to two openings located opposite each other.

In the embodiment described with reference to FIGS. 1 to 5, the sealing device has a single sealing element with which a single membrane is associated. In FIG. 1, the sealing element consists of a rigid metal plate 2 which is circular in shape. This plate is arranged opposite the open end of a pipe 4 intended to convey a fluid, for example a liquid such as water, a chemical product, a petroleum derivative or a gas. The edge 6 of the pipe 4 defines the opening 7 which is to be sealed off. In the example described, this opening is circular, but its shape could also be different, for example rectangular or square.

A membrane 8 made of a flexible material such as an elastomer is fixed by its circumference to the plate 2. It is obvious that the type of elastomer must be compatible with the type of fluid to be sealed off. The thickness of the membrane is dependent on the sealing pressure. The membrane is fixed by means of a ring 10. It is clamped between the plate 2 and the ring which is held in position by screws 12.

FIGS. 4 and 5 show two variations of embodiment of the ring. In FIG. 5, the ring has two concentric ribs 10a which penetrate into corresponding annular grooves 2a provided in the plate 2, when the ring 10 is positioned. The ribs 10a and the grooves 2a have the function of clamping the membrane 8 more effectively. In FIG. 4, the plate 2 has a recess 2b which cooperates with an anular shoulder 10b of the ring. The function of the recess 2b and of the annular shoulder 10b is the same as that of the ribs 10a and grooves 2a shown in FIG. 5, ie. to clamp the membrane 8 more effectively.

The membrane 8 and the plate 2 define a volume 16. A communication hole 18 enables the volume 16 to be connected to a source of pressurized fluid (not shown) by means of a pipe 20. The pressurized fluid may be a gas or a liquid.

Mechanical means enable the plate 2 to be fixed opposite the end of the pipe 4. The plate 2 may be fixed in such a way that the membrane 8 is in direct contact with the edge 6. It may also be fixed in such a way that play exists between the edge 6 and the surface of the membrane 8. This is precisely one of the advantages of the sealing device of the invention, namely that it is able to absorb such play caused by irregularities in eveness of the edge 6 by pressurizing the volume to direct the membrane in to conformity with the edge 6 including any irregularities.

In the embodiment shown in FIG. 1, the pipe 2 itself does not have a pre-existing fixing flange. This is why separate fixing means have been provided, consisting of a clamping collar 22 shown in FIG. 3 and made up of two half-collars assembled by means of bolts. This collar is clamped at the end of the pipe 4 so as to act as a fixing flange. On the other hand, the pipe 4 shown in the detail of FIG. 2 has a pre-existing fixing flange 14. A separate collar such as 22 is therefore not necessary. Fixing lugs 24 with a stepped profile, for example four in number, have the function of fixing the assembly consisting of the plate 2, the membrane 8 and the ring 10 to the clamping collar 22 (embodiment of FIG. 1) or to the flange 14 (embodiment of FIG. 2). It will be noted that the screws 12 serve both to screw down the ring 10 onto the plate 2 and to secure the assembly consisting of the plate 2, membrane 8 and ring 10 to the end of the pipe 4. However, this is not indispensable and two kinds of screws could be provided in order to perform these two functions separately.

In order to implement the sealing device shown in FIGS. 1 to 5, the volume 16 is connected to a source of pressurized fluid by means of the pipe 20. The flexible membrane 8 is deformed until it bears against the edges 6 of the opening to be sealed. The main advantage of this device is that the flexible membrane 8 is capable of being deformed to a far greater extent than a conventional type of gasket. Consequently, it is able to compensate for far greater variations in shape and position defining edge 6.

The above description relates to application of the device of the invention for sealing a pipe with or without a fixing flange. It is obvious that is can be used for many other applications: lock chamber for contaminanted zones, entry port for isolation bubbles in field hospitals, diving bell for underwater works, for example.

Figure 7:
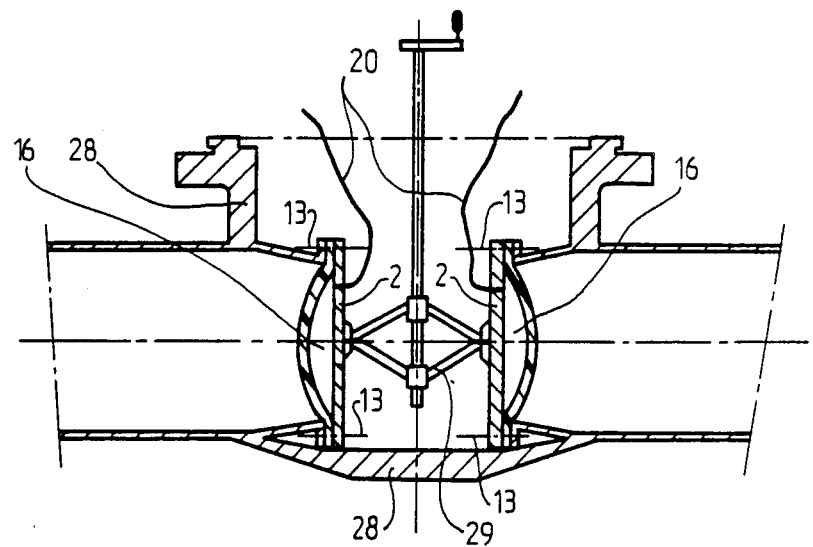

Two other applications of the sealing device are shown in FIGS. 6 and 7. The application shown in FIG. 6 relates to sealing of eahc of the openings of a pipe 4 from which a section has been cut out; the application shown in FIG. 7 relates to the temporary sealing of the inside of a valve body 28. Two separate assemblies consist of a plate 2, a membrane 8 and a clamping ring 10 fixed to the plate by means of screws 13. A communication hole 18 provided in each of the plates 2 enables the volumes 16 defined by a plate 2 and the corresponding membrane 8 to be connected to a source of pressurized fluid (not shown). These two applications differ from those shown in FIGS. 1 to 5 in the different design of the means for holding the plates 2 so that they face the ends of the pipes 4. The two devices are mounted in opposition to each other and held in position by a mechanical system which ensures that they are applied against the end of the pipes 4. In FIG. 6, these means consist of a sliding jack 26 which ensures that the volumes 16 are simultaneously pressurized. In FIG. 7, they consist of a jack 29, such as a car jack. The volumes 16 are pressurized separately by means of the pipes 20.

Figure 8:
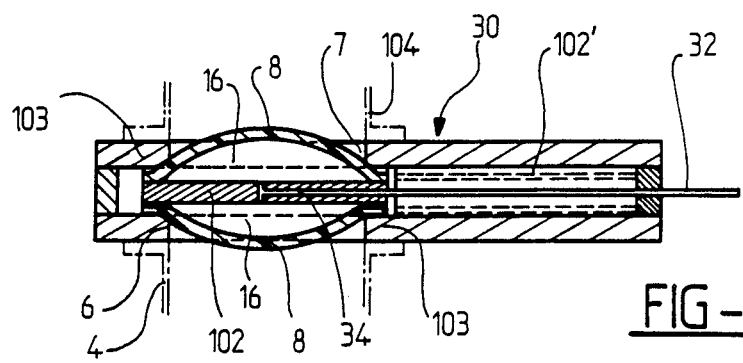
FIG. 8 shows a slide valve with a sealing device according to the invention.

FIG. 8 shows an application of the sealing device to a slide valve. This valve comprises a valve body with two parallel walls 103 in which openings 7 are formed, which openings are connected to pipes 104 located on either side of the valve body. The valve body defines a passage for a gaseous or liquid fluid. A sliding piece 102, which constitutes a sealing element, can be moved between a closed position shown in FIG. 8, where it blocks the passage for the fluid, and an open position shown in broken lines and indicated by the reference number 102', where it leaves the passage free. A control pin 32 enables the sliding piece 102 to be moved between its open position 102 and its closed position. Moreover, the pin 32 is hollow and is connected to a channel 34 which passes widthwise through the sliding piece 102 and which separates into two channels which each emerge in one of the volumes 16 so as to connect the latter to a single source of pressure.

It is required to ensure tightness between each of the membranes 8 and the edge 6. This is achieved, as in the case of the previous embodiments, by deforming the membranes 8, by applying pressure, until they come into contact with these edges 6. The ability of the membranes 8 to be deformed enables them to accommodate play between the sliding piece 102 and the edge 6 as well as any imprecision in the position of the sliding piece 102.

A slide valve of this type is used, for example, in the lock chamber of glove boxes.

Of course, the invention is not limited to precisely those embodiments described, but may embrace any variation remaining within the inventive idea.

I claim:

1. A device for permanently sealing an opening of a free end of a pipe, the free end having a first predetermined outer diameter and an end surface, the device comprising:
   a sealing assembly comprising;
   a sealing plate having a second predetermined diameter greater than the first predetermined outer diameter of the pipe, the sealing plate having a communication hole and an outer edge portion,
   a flexible membrane having a third predetermined diameter generally equal to the second predetermined diameter of the sealing plate, the membrane having a peripheral portion and a sealing portion concentric with the preipheral portion of the flexible membrane,
   an annular ring securd to the outer edge portion of the sealing plate and extending concentrically about the free end of the pipe, the annular ring secured to the sealing plate to clamp the peripheral portion therebetween to define a volume, the volume being in communication with the communication hole and thereby in communication with a source of pressurized fluid, and
   means for securing the sealing assembly to the pipe with the ring positioned to encircle the free end of the pipe and the flexible membrane abutting the edge of the pipe, such that the membrane sealingly contacts the end surface of the pipe when the volume is pressurized by fluid from the source of pressurized fluid.

2. The device as claimed in claim 1, wherein the ring has ribs which penetrate into annular grooves provided in the sealing plate so as to clamp the membrane more effectively.

3. The device as claimed in claim 1, wherein the ring has a shoulder which engages a corresponding recess in the sealing plate, so as to clamp the membrane more effectively.

4. The device as claimed in claim 1, wherein the means for securing the sealing element opposite the opening comprises a plurality of lugs fixed to the sealing plate, a collar fixed adjacent to the edge of the pipe being held between the sealing element and the plurality of lugs.

* * * * *